United States Patent
Boertjes et al.

(10) Patent No.: US 9,831,977 B2
(45) Date of Patent: *Nov. 28, 2017

(54) PHOTONIC ROUTING SYSTEMS AND METHODS COMPUTING LOOP-FREE TOPOLOGIES

(71) Applicant: Ciena Corporation, Hanover, MD (US)

(72) Inventors: David Weldon Boertjes, Nepean (CA); Stephen Daniel Shew, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,079

(22) Filed: Oct. 27, 2016

(65) Prior Publication Data

US 2017/0048017 A1    Feb. 16, 2017

Related U.S. Application Data

(63) Continuation of application No. 14/796,089, filed on Jul. 10, 2015, now Pat. No. 9,509,428, which is a
(Continued)

(51) Int. Cl.
*H04J 14/00* (2006.01)
*H04J 14/02* (2006.01)
(Continued)

(52) U.S. Cl.
CPC .......... *H04J 14/0227* (2013.01); *H04B 10/27* (2013.01); *H04J 14/0204* (2013.01);
(Continued)

(58) Field of Classification Search
CPC ............... H04J 14/0204; H04J 14/0227; H04J 14/0212; H04J 14/0267; H04J 14/0268;
(Continued)

(56) References Cited

U.S. PATENT DOCUMENTS 5,285,449 A    2/1994 Georgiou
6,480,309 B1   11/2002 Lee et al.
(Continued)

OTHER PUBLICATIONS

Han Sun, Kuang-Tsan Wu, and Kim Roberts; Real-time Measurement of 40 Gb/s Coherent System; Optics Express, vol. 16, No. 2, Jan. 21, 2008.

(Continued)

*Primary Examiner* — Kinam Park
(74) *Attorney, Agent, or Firm* — Clements Bernard Walker PLLC; Christopher L. Bernard; Lawrence A. Baratta, Jr.

(57) ABSTRACT

Systems and methods for routing wavelengths in an optical network include responsive to a path request for a wavelength or group of wavelengths, determining a path through the optical network; determining a location on the path where wavelength blocking should occur to form a loop-free path in the optical network; and setting the wavelength blocking at the location. The optical network can utilize a broadcast and select architecture and the wavelength blocking is configured to prevent the wavelength or group of wavelengths from looping back on a port where the wavelength or group of wavelengths has already been received on. The optical network can utilize an all-broadcast architecture and the wavelength blocking is configured to prevent multiple paths for the wavelength or group of wavelengths by constraining the wavelength or group of wavelengths to a single path through the optical network.

20 Claims, 9 Drawing Sheets

Related U.S. Application Data continuation of application No. 13/945,310, filed on Jul. 18, 2013, now Pat. No. 9,083,484, which is a continuation-in-part of application No. 13/452,322, filed on Apr. 20, 2012, now Pat. No. 8,509,618, which is a continuation-in-part of application No. 13/371,920, filed on Feb. 13, 2012, now Pat. No. 8,554,074.

(51) Int. Cl.

| | | |
|---|---|---|
| *H04L 12/721* | (2013.01) | |
| *H04B 10/27* | (2013.01) | |
| *H04Q 11/00* | (2006.01) | |
| *H04L 12/715* | (2013.01) | |
| *H04L 12/705* | (2013.01) | |
| *H04L 12/24* | (2006.01) | |
| *H04L 12/703* | (2013.01) | |

(52) U.S. Cl.
CPC ...... *H04J 14/0212* (2013.01); *H04J 14/0238* (2013.01); *H04J 14/0267* (2013.01); *H04J 14/0268* (2013.01); *H04L 41/12* (2013.01); *H04L 45/12* (2013.01); *H04L 45/18* (2013.01); *H04L 45/62* (2013.01); *H04L 45/64* (2013.01); *H04Q 11/0005* (2013.01); *H04Q 11/0062* (2013.01); *H04J 14/022* (2013.01); *H04J 14/0206* (2013.01); *H04J 14/0213* (2013.01); *H04J 14/0275* (2013.01); *H04J 14/0286* (2013.01); *H04J 14/0297* (2013.01); *H04L 45/28* (2013.01); *H04Q 2011/009* (2013.01); *H04Q 2011/0015* (2013.01); *H04Q 2011/0016* (2013.01); *H04Q 2011/0018* (2013.01)

(58) Field of Classification Search
CPC ............... H04J 14/0238; H04J 14/0213; H04J 14/0206; H04J 14/022; H04J 14/0286; H04J 14/0297; H04J 14/0275
See application file for complete search history.

(56) References Cited

U.S. PATENT DOCUMENTS

| | | | |
|---|---|---|---|
| 6,895,184 B2 | 5/2005 | Way | |
| 7,369,766 B2 | 5/2008 | Bannister et al. | |
| 8,111,612 B2 | 2/2012 | Dziong et al. | |
| 8,131,149 B2 | 3/2012 | Zottmann | |
| 8,509,618 B2 * | 8/2013 | Boertjes | H04J 14/0204 398/45 |
| 9,083,484 B2 | 7/2015 | Boertjes et al. | |
| 9,509,428 B2 * | 11/2016 | Boertjes | H04J 14/0204 |
| 2002/0126670 A1 | 9/2002 | Yamauchi et al. | |
| 2003/0025961 A1 | 2/2003 | Way | |
| 2005/0068968 A1 | 3/2005 | Ovadia et al. | |
| 2005/0158047 A1 | 7/2005 | Way et al. | |
| 2005/0240796 A1 | 10/2005 | Dziong et al. | |
| 2006/0153496 A1 | 7/2006 | Tanobe et al. | |
| 2006/0275034 A9 | 12/2006 | Way et al. | |
| 2007/0242607 A1 | 10/2007 | Sadler et al. | |
| 2009/0175620 A1 | 7/2009 | Bhatnagar et al. | |
| 2009/0232497 A1 | 9/2009 | Archambault et al. | |
| 2010/0111520 A1 | 5/2010 | Way | |
| 2011/0222862 A1 | 9/2011 | Boertjes et al. | |
| 2011/0268442 A1 | 11/2011 | Boertjes et al. | |

OTHER PUBLICATIONS

L. E. Nelson et al.; Performance of a 46-Gbps Dual—Polarization QPSK Transceiver in a High-PMD Fiber Transmission Experiment; Conference Paper, Optical Fiber Communication Conference (OFC); San Diego, CA, Feb. 24, 2008.

Peter Ashwood-Smith; "Shortest Path Bridging IEEE 802.1aq Overview"—APRICOT/Hong Kong/Feb. 24, 2011.

Jerome Chiabaut, Nigel Bragg; "This is the Way—Speeding up the SPB Computation"; NORTEL, Nov. 2009.

Peter Ashwood-Smith; Shortest Path Bridging, IEEE 802.1aq, Tutorial and Demo; NANOG 50 Oct. 2010.

David Allan, Peter Ashwood-Smith, Nigel Bragg, Janos Farkas, Don Fedyk, Michel Ouellete, Mick Seaman, Paul Unbehagen; "Shortest Path Bridging: Efficient Control of Larger Ethernet Networks"; IEEE Communications Magazine, Oct. 2010.

Ashwin Gumaste; ONTC Newsletter "Prism"; vol. 1, No. 3—Aug. 2010.

* cited by examiner

All links have cost equal to 1 except link 14-12 with cost equal to 3.

– – –▶  Shortest path tree rooted at 7
·······▶  Shortest path tree rooted at 10
———▶  Shortest path tree rooted at 4

All links have cost equal to 1 except link S12 with cost equal to 3.

------▶ Multipoint to point tree congruent with SPT rooted at 4
——▶ Shortest path tree rooted at 4

US 9,831,977 B2

PHOTONIC ROUTING SYSTEMS AND METHODS COMPUTING LOOP-FREE TOPOLOGIES

CROSS-REFERENCE TO RELATED APPLICATION(S)

The present non-provisional patent application/patent is a continuation of U.S. patent application Ser. No. 14/796,089, filed on Jul. 10, 2015, and entitled "PHOTONIC ROUTING SYSTEMS AND METHODS COMPUTING LOOP-FREE TOPOLOGIES," which is a continuation of U.S. patent application Ser. No. 13/945,310, filed on Jul. 18, 2013 (now U.S. Pat. No. 9,083,484 which issued on Jul. 14, 2015), and entitled "SOFTWARE DEFINED NETWORKING PHOTONIC ROUTING SYSTEMS AND METHODS," which is a continuation-in-part of U.S. patent application Ser. No. 13/452,322, filed on Apr. 20, 2012 (now U.S. Pat. No. 8,509,618 which issued on Aug. 13, 2013), and entitled "PHOTONIC ROUTING SYSTEMS AND METHODS FOR LOOP AVOIDANCE," and a continuation-in-part of U.S. patent application Ser. No. 13/371,920, filed on Feb. 13, 2012 (now U.S. Pat. No. 8,554,074 which issued on Oct. 8, 2013), and entitled "COLORLESS, DIRECTIONLESS, AND GRIDLESS OPTICAL NETWORK, NODE, AND METHOD," the contents of each are incorporated in full by reference herein.

FIELD OF THE INVENTION

Generally, the field of art of the present disclosure pertains to optical network systems and methods, and more particularly, to software defined networking (SDN) photonic routing systems and methods in optical networks such as, for example, broadcast and select optical networks, all-broadcast optical networks, etc., which use loop avoidance techniques to find loop-free paths through the network for one or more wavelengths.

BACKGROUND OF THE INVENTION

The routing problem in optical network is defined as determining individual wavelength paths in a Dense Wave Division Multiplexing (DWDM) network considering functions such as regeneration, amplification, Reconfigurable Optical Add/Drop Multiplexers (ROADMs), Fixed Optical Add/Drop Multiplexes (FOADMs), optical cross connects, wavelength converters, and the like. Some descriptions of this are in IETF RFC 6163 "Framework for GMPLS and Path Computation Element (PCE) Control of Wavelength Switched Optical Networks (WSONs)," April 2011, the contents of which are incorporated by reference herein. In addition to the aforementioned functions, other aspects in routing include wavelength continuity, non-linear impairments, and the like. As such, routing of individual optical channels can be an extremely complex proposition. As technology evolves, impairment effects, signal loss, etc. are becoming less applicable in the routing considerations. This is also the case in campus, metro, and/or regional networks in which degree size (e.g., typically four or less) and distance are such that various aspects can be eliminated in the routing problem. Further, conventional photonic networks cannot perform restoration from line faults at the speed expected for protection. By photonic, this refers to switching at the wavelength level as opposed to switching at a Time Division Multiplexing (TDM) level (e.g., Optical Transport Network (OTN), Synchronous Optical Network (SONET, Synchronous Digital Hierarchy (SDH), etc.).

Two exemplary photonic networks include a broadcast and select optical network and an all-broadcast optical network. The broadcast and select optical network forms individual nodes based on WSSs and 1:N splitters to form a ROADM degree architecture. Examples of broadcast and select optical networks are described in commonly assigned U.S. patent application Ser. No. 11/970,575 filed Jan. 8, 2008 and entitled "WAVELENGTH-SWITCHED OPTICAL ADD-DROP MULTIPLEXER WITH WAVELENGTH BROADCASTING CAPABILITY" and commonly assigned U.S. patent application Ser. No. 12/103,204 filed Apr. 15, 2008 and entitled "DIRECTIONLESS RECONFIGURABLE OPTICAL ADD-DROP MULTIPLEXER SYSTEMS AND METHODS," the contents of each are incorporated by reference herein. Examples of all-broadcast optical networks are described in commonly assigned U.S. patent application Ser. No. 12/436,470 filed May 6, 2009 and entitled "OPTICAL ROUTING DEVICE AND OPTICAL NETWORK USING SAME" and commonly assigned U.S. patent application Ser. No. 13/371,920 filed Feb. 13, 2012 and entitled "COLORLESS, DIRECTIONLESS, AND GRIDLESS OPTICAL NETWORK, NODE, AND METHOD," the contents of each are incorporated by reference herein.

BRIEF SUMMARY OF THE INVENTION

In an exemplary embodiment, a method for routing wavelengths in an optical network includes, responsive to a path request for a wavelength or group of wavelengths, determining a path through the optical network; determining a location on the path where wavelength blocking should occur to form a loop-free path in the optical network; and setting the wavelength blocking at the location. The optical network can utilize a broadcast and select architecture and the wavelength blocking is configured to prevent the wavelength or group of wavelengths from looping back on a port where the wavelength or group of wavelengths has already been received on. The optical network can utilize an all-broadcast architecture and the wavelength blocking is configured to prevent multiple paths for the wavelength or group of wavelengths by constraining the wavelength or group of wavelengths to a single path through the optical network. The determining a location on the path where wavelength blocking should occur can utilize a spanning tree in the optical network from any node in the optical network to a root node, and wherein the wavelength blocking is based on the spanning tree. The determining a location on the path where wavelength blocking should occur can utilize a shortest path tree in the optical network from any node in the optical network to a root node, and wherein the wavelength blocking is based on the shortest path tree. The determining a location on the path where wavelength blocking should occur can utilize Ethernet Ring Protection Switching as a control protocol. The determining a location on the path where wavelength blocking should occur can utilize an optical routing protocol associated with the optical network. The determining a location on the path where wavelength blocking should occur can utilize link state protocols and associated link state messages to determine the wavelength blocking.

In another exemplary embodiment, a system for routing wavelengths in an optical network includes a processor communicatively coupled to the optical network; and memory storing instructions that, when executed, cause the processor to, responsive to a path request for a wavelength or group of wavelengths, determine a path through the optical network, determine a location on the path where wavelength blocking should occur to form a loop-free path in the optical network, and cause the wavelength blocking at the location. The optical network can utilize a broadcast and select architecture and the wavelength blocking is configured to prevent the wavelength or group of wavelengths from looping back on a port where the wavelength or group of wavelengths has already been received on. The optical network can utilize an all-broadcast architecture and the wavelength blocking is configured to prevent multiple paths for the wavelength or group of wavelengths by constraining the wavelength or group of wavelengths to a single path through the optical network. The determining a location on the path where wavelength blocking should occur can utilize a spanning tree in the optical network from any node in the optical network to a root node, and wherein the wavelength blocking is based on the spanning tree. The determining a location on the path where wavelength blocking should occur can utilize a shortest path tree in the optical network from any node in the optical network to a root node, and wherein the wavelength blocking is based on the shortest path tree. The determining a location on the path where wavelength blocking should occur can utilize Ethernet Ring Protection Switching as a control protocol. The determining a location on the path where wavelength blocking should occur can utilize an optical routing protocol associated with the optical network. The determining a location on the path where wavelength blocking should occur can utilize link state protocols and associated link state messages to determine the wavelength blocking. The system can be a Path Computation Element.

In a further exemplary embodiment, a node in an optical network includes a plurality of degrees connected to the optical network; optical devices configured to broadcast a plurality of wavelengths through the plurality of degrees; selectively enabled blocking elements at the plurality of degrees; and a processor configured to selectively enable a blocking element responsive to a loop-free path computed in a network in which node participates, based on a routing protocol which computes the loop-free path for at least one wavelength of the plurality of wavelengths. The optical network can utilize a broadcast and select architecture and the blocking element is configured to prevent the at least one wavelength from looping back on a port where the at least one wavelength has already been received on. The optical network can utilize an all-broadcast architecture and the blocking element is configured to prevent multiple paths for at least one wavelength by constraining the at least one wavelength to a single path through the optical network.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

Figure 1:
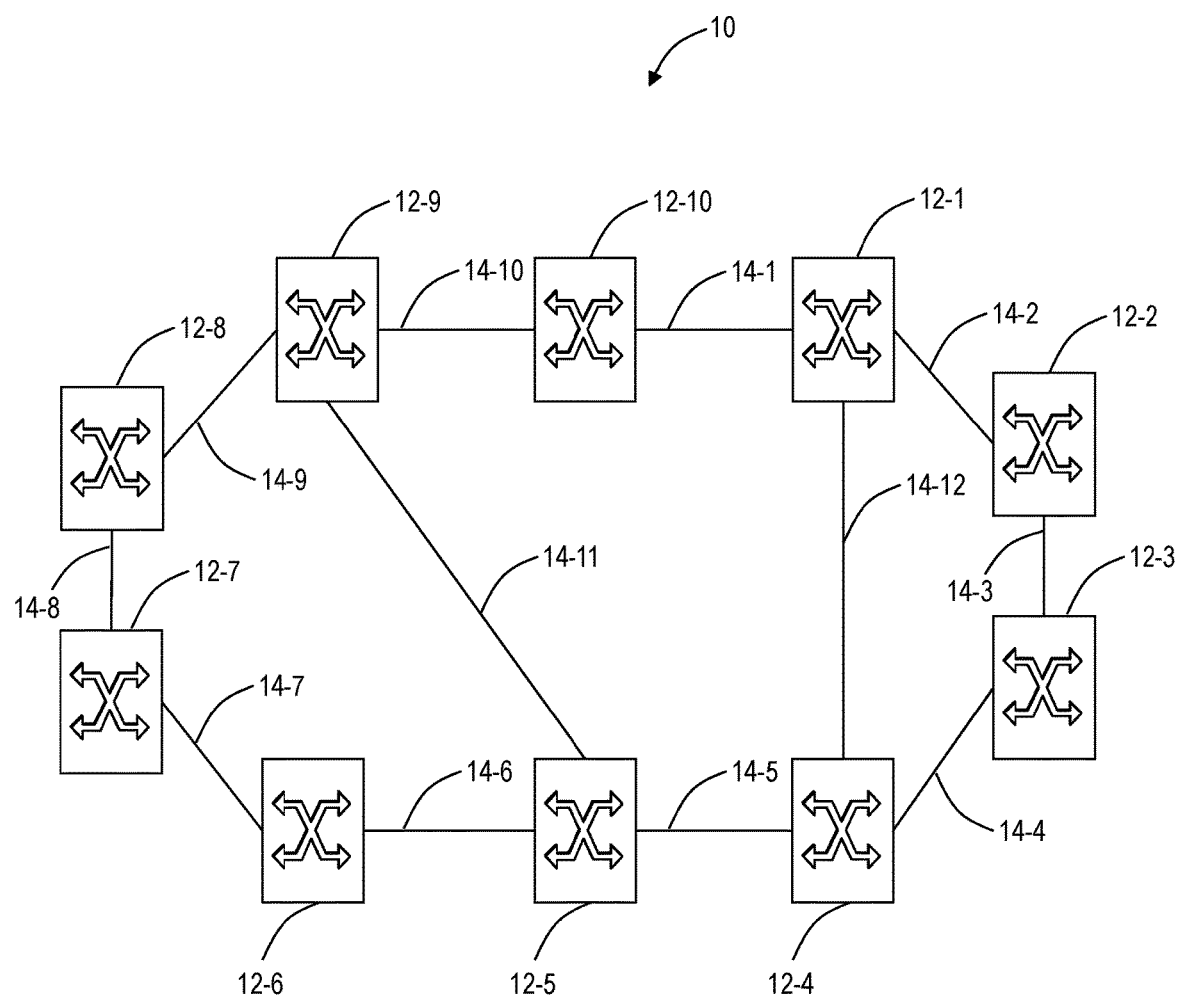
FIG. 1 is a network diagram of a photonic network with a plurality of nodes interconnected therebetween.

In various exemplary embodiments, routing systems and methods in optical networks such as, for example, broadcast and select optical networks, all-broadcast optical networks, etc., are described which use loop avoidance techniques to find loop-free paths through the network for one or more wavelengths. Using the routing systems and methods, wavelengths or groups of wavelengths are routed in a single path a network. This single path can be determined by computing a loop free forwarding path through the network. In particular, the routing systems and methods can utilize various Layer 2 and Layer 3 constructs in the photonic domain to quickly and efficient compute loop free paths on a per wavelength or per group of wavelength basis through networks. These loop free paths can be computed in response to failures thereby providing a quick and efficient restoration mechanism in the photonic domain. Stated differently, the routing systems and methods approach routing/path selection in a photonic network in a similar fashion as routing/bridging at Layers 2 and 3. Specifically, the routing systems and methods assume an all-broadcast paradigm optically regardless of optical architecture (e.g., the broadcast and select optical networks, all-broadcast optical networks, etc.), and the routing problem becomes determining which ports should be blocked. This is analogous to Ethernet packet bridging, for example. Thus, the routing systems and methods seek to apply techniques available in Ethernet packet bridging, Internet Protocol (IP) packet routing, etc. to wavelengths in the photonic domain. In an exemplary embodiment, these techniques can include Spanning Tree Protocol, Shortest Path Bridging, Ethernet Ring Protection Switching, Shortest Path Methods, Open Shortest Path First, and the like.

In an exemplary embodiment, a network includes a plurality of interconnected nodes utilizing an all-broadcast architecture for a plurality of wavelengths there between; wherein the plurality of interconnected nodes utilize a routing protocol configured to compute a loop-free path through the plurality of interconnected nodes, wherein the loop-free path utilizes at least one wavelength of the plurality of wavelengths using routing constructs adapted to a photonic domain; and at least one blocking element configured to selectively block the at least one wavelength based on the computed loop-free path. The network can further include a path computation element configured to determine locations of the at least one blocking element at the plurality of interconnected nodes based on the computed loop-free path and to communicate the determined locations to the network. The network can further include a Software Defined Networking controller including the path computation element. Each of the nodes of the plurality of interconnected nodes can utilize a broadcast and select architecture. The loop-free path can be computed using a Shortest Path Bridging computation. Responsive to a failed link between the plurality of interconnected nodes, the routing protocol can be configured to compute an updated loop-free path through the plurality of interconnected nodes with the failed link excluded. The at least one blocking element can be reconfigured to selectively block and unblock the at least one wavelength based on the updated loop-free path. The routing constructs can include Layer 2 or Layer 3 constructs adapted for the photonic domain.

In another exemplary embodiment, a processor-implemented routing method includes determining a topology of an optical network including a plurality of nodes, wherein the optical network utilizes an all-broadcast architecture for a plurality of wavelengths; determining a loop-free path for at least one wavelength of the plurality of wavelengths through the optical network utilizing a routing protocol that uses routing constructs adapted to a photonic domain; and directing at least one blocking element to selectively block the at least one wavelength based on the determined loop-free path. The method can further include performing the determining steps and the directing step using an application; and communicating locations of the at least one blocking element to the plurality of nodes. The method can further include computing a spanning tree through the optical network for the loop-free path; and assigning a cost to each of a plurality of links, with a bias in selection based on optical characteristics of each of the plurality of links. The method can further include, responsive to a failed link in the optical network, recomputing an updated loop-free path through the plurality of nodes on the plurality of links, with the failed link excluded from the recomputation; and adjusting blocking behavior of the at least one blocking element based on the updated loop-free path. The routing constructs can include Layer 2 or Layer 3 constructs adapted for the photonic domain.

In a further exemplary embodiment, a node includes a plurality of degrees; optical devices configured to broadcast a plurality of wavelengths through the plurality of degrees in an all-broadcast architecture; at least one blocking element located at one of the plurality of degrees; and a processor configured to selectively enable the at least one blocking element responsive to a loop-free path computed in a network in which node participates, wherein a routing protocol computes the loop-free path for at least one wavelength of the plurality of wavelengths using routing constructs adapted to a photonic domain. The node can further include at least one optical transceiver communicatively coupled to the plurality of degrees, wherein the optical transceiver is operable for adding a wavelength of the plurality of wavelengths and dropping a wavelength of the plurality of wavelengths, wherein a receiver of the at least one optical transceiver is a coherent receiver configured to receive all wavelengths from a connected degree and selectively tune to a wavelength of interest. The processor can operate as a path computation element that performs a loop-free computation to determine the loop-free path. The processor can operate as a Software Defined Networking controller that performs a loop-free computation to determine the loop-free path.

In a further exemplary embodiment, a photonic network includes a plurality of nodes each supporting add and drop of at least Y wavelengths; a plurality of optical links interconnecting the plurality of nodes, wherein the plurality of optical links support up to X wavelengths, Y≤X; an optical routing protocol configured to compute a loop-free path through the plurality of nodes on the plurality of links, wherein the loop-free path is computed for one of the X wavelengths or a group of the X wavelengths using routing constructs adapted to a photonic domain; and optical components at each of the plurality of nodes configured to selectively block at least one of the X wavelengths based on the computed loop-free path. The loop-free path can be computed through a spanning tree computation. The spanning tree computation can utilize costs of the plurality of optical links set to bias selection of amplified links over unamplified links. The plurality of nodes can include a broadcast and select architecture.

The loop-free path can be computed through a Shortest Path Bridging computation. The Shortest Path Bridging computation can be compliant to IEEE 802.1aq (2011) and replaces Ethernet bridges with the plurality of nodes and Ethernet links with the plurality of links; and wherein the Shortest Path Bridging computation defines a Shortest Path Virtual Local Area Network Identifier (SPVID) in the photonic network as identifying unidirectional Shortest Path Trees for multicast traffic for one or more wavelengths sharing common root and endpoints. Wavelength selective switches in the broadcast and select architecture can be programmed to block at least one wavelength on ports not on a Shortest Path Tree for wavelengths belonging to that Shortest Path Tree. Responsive to a failed link of the plurality of links, the optical routing protocol can be configured to compute an updated loop-free path through the plurality of nodes on the plurality of links with the failed link excluded from the computation. The optical components at each of the plurality of nodes can be reconfigured to selectively block and unblock the at least one of the X wavelengths based on the updated loop-free path.

The loop-free path can be computed utilizing a plurality of costs associated with each of the plurality of links; and wherein the plurality costs can be derived based on factors including link length, link loss, regeneration, amplification, non-linear effects, and available bandwidth. The routing constructs can include Layer 2 or Layer 3 constructs; wherein the Layer 2 or Layer 3 constructs can include any of Spanning Tree Protocol, Shortest Path Bridging, Ethernet Ring Protection Switching, and Open Shortest Path First; and wherein the Layer 2 or Layer 3 constructs can be adapted to the photonic domain by treating wavelengths equivalent to one of packet traffic and virtual private networks in the Layer 2 or Layer 3 constructs.

In a further exemplary embodiment, a processor-implemented photonic routing method includes modeling an optical network as a plurality of nodes interconnected by a plurality of links; assigning a cost to each of the plurality of links; utilizing a routing technique to compute a loop-free path for N wavelengths through the plurality of nodes, wherein the routing technique is adapted to operate on the N wavelengths in a photonic domain, wherein the loop-free path includes any feasible combination of links of the plurality of links; and setting a plurality of optical components in the optical network based on the computed loop-free path. The method can further include computing a spanning tree through the optical network for the loop-free path; and assigning the cost to each of the plurality of links with a bias to encourage selection of amplified links over unamplified links. The plurality of nodes can include a broadcast and select architecture.

The method can further include computing the loop-free path through a Shortest Path Bridging computation. The Shortest Path Bridging computation can be compliant to IEEE 802.1aq (2011) and replaces Ethernet bridges with the plurality of nodes and Ethernet links with the plurality of links; and wherein the Shortest Path Bridging computation defines a Shortest Path Virtual Local Area Network Identifier (SPVID) in the photonic network as identifying unidirectional Shortest Path Trees for multicast traffic for one or more wavelengths sharing common root and endpoints. Wavelength selective switches in the broadcast and select architecture can be programmed to block at least one wavelength on ports not on a Shortest Path Tree for wavelengths belonging to that Shortest Path Tree.

The method can further include, responsive to a failed link of the plurality of links, recomputing an updated loop-free path through the plurality of nodes on the plurality of links with the failed link excluded from the computation; and adjusting blocking behavior of the optical components at each of the plurality of nodes based on the updated loop-free path. The routing technique can include one of a Layer 2 technique and a Layer 3 technique; wherein the Layer 2 technique or the Layer 3 technique can include any of Spanning Tree Protocol, Shortest Path Bridging, Ethernet Ring Protection Switching, and Open Shortest Path First; and wherein the Layer 2 technique or the Layer 3 technique can be adapted to the photonic domain by treating wavelengths equivalent to packet traffic and/or virtual private networks in the Layer 2 technique or the Layer 3 technique.

In yet another exemplary embodiment, a photonic node includes N degrees; Y local add/drop channels; optical components configured to selectively block up to X wavelengths at any of the N degrees, Y≤X, wherein the optical components include one of a wavelength selective switch configured to selectively block any wavelength exiting any port and an optical blocking element located in-line with each of the N degrees; and a processor executing an optical routing protocol configured to compute a loop-free path through a network in which the photonic node participates, wherein the loop-free path is computed for one of the X wavelengths or a group of the X wavelengths using routing constructs adapted to a photonic domain, and wherein the optical routing protocol is communicatively coupled to the optical components for setting blocking based on the computed loop-free path.

Photonic Network Architecture

Referring to FIG. 1, in an exemplary embodiment, a photonic network 10 is illustrated with a plurality of nodes 12-1-12-10 interconnected therebetween. The nodes 12-1-12-10 are interconnected by links 14-1-14-12. The nodes 12-1, 12-4, 12-5, 12-9 are three degree nodes and the remaining nodes 12-2, 12-3, 12-6, 12-7, 12-8, 12-10 are two degree nodes. Each of the nodes 12 include various photonic components supporting local add/drop of wavelengths and routing of the local add/drop wavelengths and express wavelengths between the degrees. For example, the network 10 can support X wavelengths on each of the links 14 and each of the nodes 12 can add/drop up to Y wavelengths, Y≤X. Of course, each of the links 14 can include two optical fibers for bi-directional communication between the nodes 12. In such a case, each of the fibers can include up to the X wavelengths which the X wavelengths being transmitted in opposite directions on each of the two optical fibers. The X wavelengths can be any bit rate (e.g., 1.25G, 2.5G, 10G, 40G, 100G, 400G, etc.) and any format (e.g., SONET, SDH, OTN, Ethernet, etc.). In an exemplary embodiment, the X wavelengths can be in the C-band which includes optical spectrum of about 1530-1565 nm corresponding to the amplification range and bandwidth of erbium-doped fiber amplifiers (EDFAs). Alternatively, the X wavelengths can be in other bands, such as the L-band, the S-band, etc.

The X wavelengths on the links 14 can be placed in specific channels on optical spectrum associated with an optical fiber. For example, the ITU-T provides a standard set of channels offset by equal frequency spacing, e.g., 12.5 GHz, 25 GHz, 50 GHz, and 100 GHz, ("ITU-T grid"). For example, the standardization of optical spectrum are described in ITU-T Recommendation G.694.1 (February 2012) Spectral grids for WDM applications: DWDM frequency grid and ITU-T Recommendation G.698.2 (November 2009) Amplified multichannel DWDM applications with single channel optical interfaces, the contents of each are incorporated by reference herein. For example, using the ITU-T grid, X could equal 44 for 100 GHz spacing or 88 for 50 GHz spacing. Alternatively, the X channels on the links 14 could use arbitrarily defined channels providing any number of channels for X on the optical spectrum. With respect to the network 10, there will be any number of wavelengths on each of the links 14 up to X per link. Each of the wavelengths in the network 10 will have an originating node 12 and a terminating node 12 optionally expressing through any number of intermediate nodes 12. As is described herein, the routing systems and methods seek to treat the wavelengths as Layer 2 and Layer 3 constructs in the photonic domain to enable quick and efficient routing.

Figure 2:
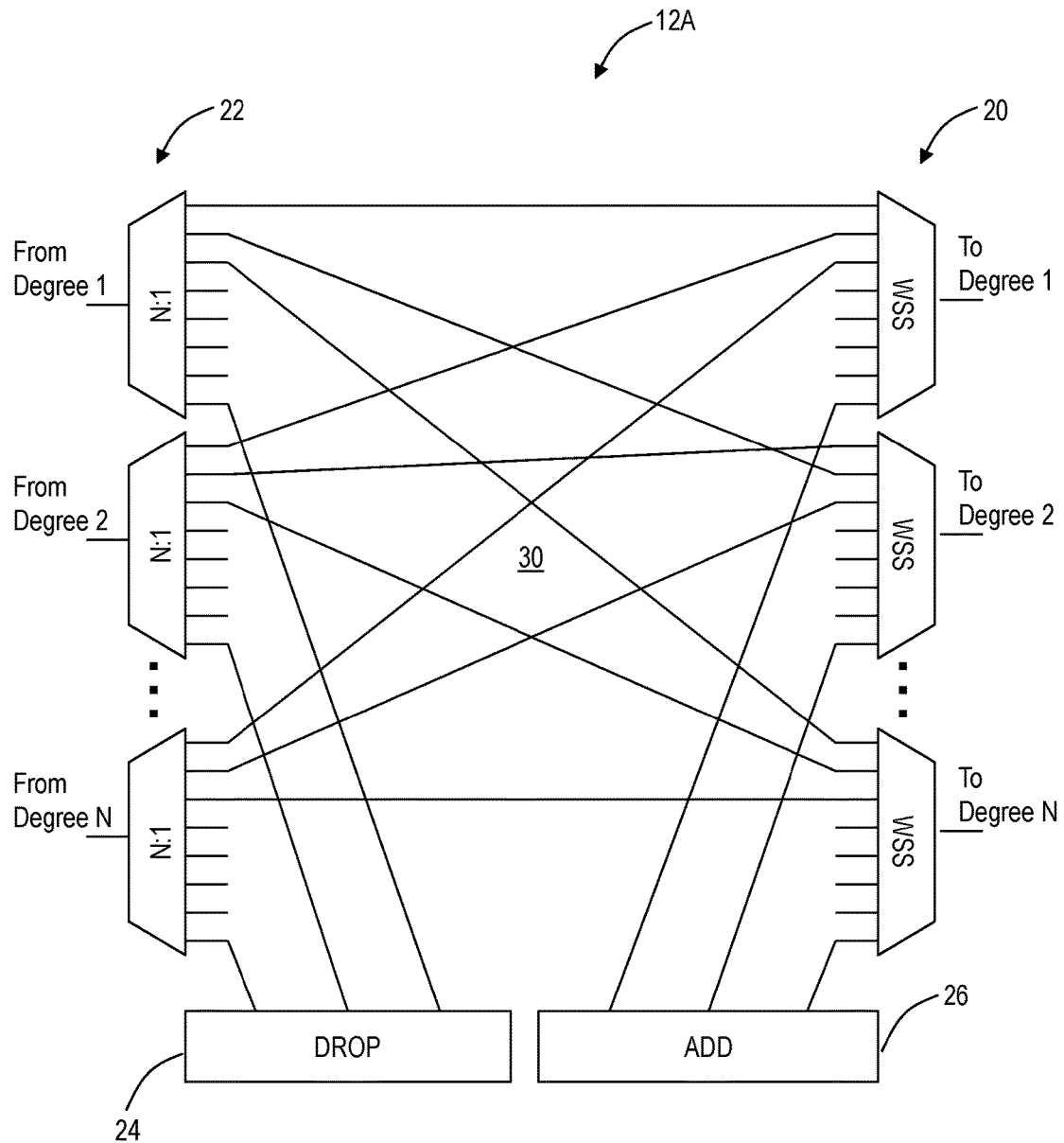
FIG. 2 is a schematic diagram of an exemplary implementation of a node for the network of FIG. 1 in a broadcast and select architecture.

Referring to FIG. 2, in an exemplary embodiment, a schematic diagram illustrates an exemplary implementation of a node 12A in a broadcast and select architecture. One or more nodes in the network 10 can be implemented using the broadcast and select architecture of the node 12A. The broadcast and select architecture can be formed by WSSs 20 and 1:N splitters 22. Further, the node 12A can include directionless add/drop components 24, 26 for local add/drop of wavelengths, i.e., for the Y wavelengths. Wavelengths flow from left to right in the node 12A. Specifically, wavelengths originating from any of N degrees are broadcast by the 1:N splitters 22 to N possible output ports, i.e., each of the other N degrees and the drop components 24. Thus, the 1:N splitters 22 provide a first stage of broadcast in the broadcast and select architecture. The WSSs 20 are configured to selectively receive wavelengths from the 1:N splitters 22 and the add components 26. Thus, the WSSs 20 provide a second stage of select in the broadcast and select architecture. Note, from the perspective of the WSSs 20, the associated functionality can be construed as selecting certain wavelengths but conversely can also be construed as blocking other wavelengths.

Thus, the optical broadcast and select architecture is characterized by multiple wavelengths that are broadcast on each node to all ports except the incoming one and selective blocking of wavelengths exiting those ports. The purpose of wavelength blocking is to prevent a wavelength from looping back on a port, through the network 10, it has already been received on. In another exemplary embodiment, an entire port can be blocked at a time and wavelengths are not selectively blocked. The routing systems and methods are configured, using Layer 2 and/or Layer 3 constructs, to compute where wavelength blocking should occur to form a loop-free path in the network 10 for a wavelength or groups of wavelengths. Using the node 12A, the routing systems and methods are configured to determine blocking settings on the WS Ss 20. The routing systems and methods can include engineering optical networks such that any combination of computed loop free paths is feasible. Those of ordinary skill in the art will recognize that the broadcast and select architecture can utilize different components and structure from the WSSs 20 and 1:N splitters 22, and the routing systems and methods described herein can equally apply to any physical implementation of the broadcast and select architecture.

Figure 3:
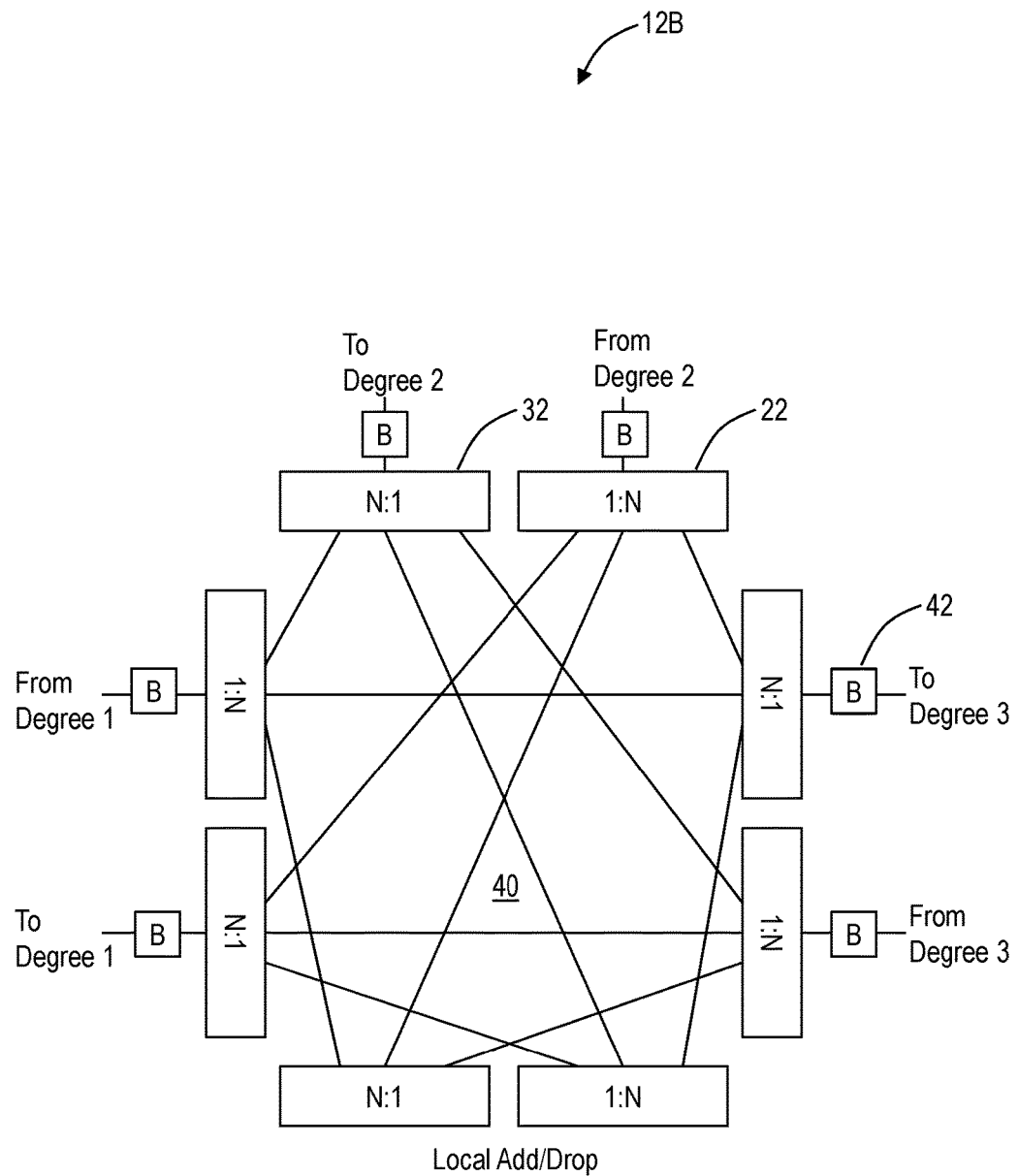
FIG. 3 is a schematic diagram of an exemplary implementation of a node for the network of FIG. 1 in an all-broadcast architecture.

Referring to FIG. 3, in an exemplary embodiment, a schematic diagram illustrates an exemplary implementation of a node 12B in an all-broadcast architecture. One or more nodes in the network 10 can be implemented using an all-broadcast architecture of the node 12B. For example, FIG. 3 is an exemplary embodiment from commonly assigned U.S. patent application Ser. No. 13/371,920 filed Feb. 13, 2012 and entitled "COLORLESS, DIRECTIONLESS, AND GRIDLESS OPTICAL NETWORK, NODE, AND METHOD." The all-broadcast architecture can be formed by N:1 combiners 32 and 1:N splitters 22. The node 12B is shown for illustration purposes as a three degree node, i.e., N=3 for the N:1 combiners 22 and the 1:N splitters 22. It is also possible to construct the node 12B as a two degree node or more using less ports on the devices 22, 32 or adding additional ports on the devices 22, 32. The devices 22, 32 form a routing fabric 40 in which received signals on any degree are simultaneously broadcast to all other degrees and to local add/drop, i.e., as the term all-broadcast architecture implies. The local add/drop can include tunable transceivers, such as coherent receivers configured to receive all wavelengths on the optical spectrum and selectively tune to a wavelength of interest. The node 12B also includes optical blocking elements 42 on each external port to and from the various degrees. For the all-broadcast architecture in the network 10, the optical blocking elements 42 prevent multiple paths by constraining each channel to a single path. The optical blocking elements 42 can be remotely set to on/off and in implementation can include, for example, a selectively enabled VOA. Using the node 12B, the routing systems and methods are configured to determine blocking settings on the optical blocking elements 42. Note, the optical blocking elements 42 can be anywhere in the node 12B, such as on the egress, ingress, etc. In an exemplary embodiment, the optical blocking elements 42 can be made to be wavelength selective which would be equivalent to having the WSSs 20 in the node 12B as well.

The nodes 12 in the network 10 can include the broadcast and select architecture, the all-broadcast architecture, or a combination thereof. Further, these architectures are described herein for illustration purposes, and those of ordinary skill in the art will recognize the routing systems and methods can be used with any optical network architecture to determine appropriate routing of a wavelength or group of wavelengths through the network. With the broadcast and select architecture, the routing systems and methods can be used to determine WSS settings for wavelength blocking. With the all-broadcast architecture, the routing systems and methods can be used to determine optical blocking element settings. For a generalized optical nodal architecture, the routing systems and methods can be used to determine appropriate component settings ensuring a wavelength or group of wavelengths traverses a loop-free path in the network. That is, the routing systems and methods can be utilized to determine and/or set various component settings on optical devices such that the wavelength or group of wavelengths is constrained to a single path in the network. Exemplary devices in the generalized optical nodal architecture can include variable optical attenuators (VOAs), WSS pixel settings, optical blockers, tunable optical filters, microelectromechanical systems (MEMS) devices, ROADMs, optical switches, tunable optical transceivers, etc. The network 10 can be constructed from the broadcast and select architecture, the all-broadcast architecture, any generalized optical nodal architecture, and combinations thereof.

Optical Routing Systems and Methods

In various exemplary embodiments, the routing systems and methods seek to apply Layer 2 or 3 constructs in the photonic domain to calculate loop free paths in the network 10. Conceptually, the routing systems and methods can treat a wavelength or group of wavelengths as a Layer 2 or 3 construct using methods therein for routing in loop-free topologies. Using Ethernet and IP techniques for path routing, the routing systems and methods can quickly and efficiently compute wavelength paths through the network 10. The associated settings from any computation can be implemented in the various components associated with the broadcast and select architecture, the all-broadcast architecture, any generalized optical nodal architecture, and combinations thereof. The routing systems and methods utilize calculations previously reserved for Ethernet or IP networks to compute trees in an optical network. Exemplary techniques for the routing systems and methods can include spanning trees and variants thereof, shortest path bridging and variants thereof, Ethernet Ring Protection Switching, shortest path methods, Layer 3 distributed routing protocols such as Open Shortest Path First (OSPF), and the like.

Spanning Tree Protocol

Figure 4:
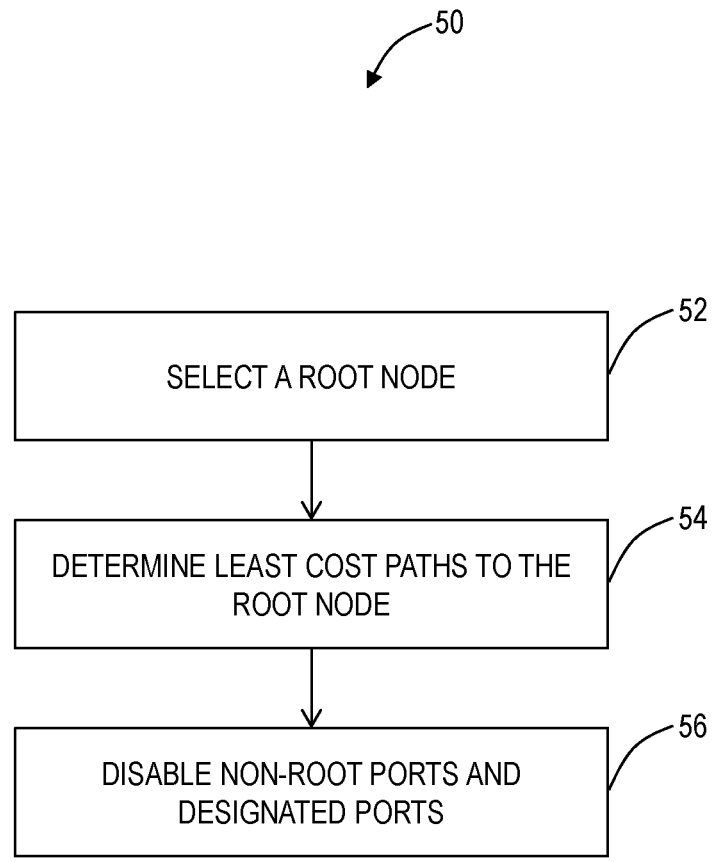
FIG. 4 is a flowchart of a spanning tree method for computing a path for a wavelength or group of wavelengths in the network.

Referring to FIG. 4, in an exemplary embodiment, a flowchart illustrates a spanning tree method 50 for computing a path for a wavelength or group of wavelengths in the network 10. IEEE 802.1d "Media Access Control (MAC) Bridges" (June 2004), the contents of which are incorporated by reference herein, includes a Spanning Tree Protocol (STP) that ensures a loop-free topology for any bridged Ethernet local area network. The basic function of STP is to prevent bridge loops and the broadcast radiation that results from them. Spanning tree also allows a network design to include spare (redundant) links to provide automatic backup paths if an active link fails, without the danger of bridge loops, or the need for manual enabling/disabling of these backup links. In an exemplary embodiment, the spanning tree method 50 can be used to route wavelengths through the network 10. The spanning tree method 50 can be based on IEEE 802.1d or variants thereof, e.g., Rapid STP, per Virtual Local Area Network (VLAN) Spanning Tree (PVST), VLAN Spanning Tree Protocol (VSTP), etc. The method 50 begins with selecting a root node (step 52). In the Ethernet domain, the STP selects a root bridge, but in the photonic context, the method 50 selects the root node, i.e., one of the nodes 12 in the network 10. The method 50 can include provisioning of priorities in the nodes 12 which would allow the election of preferred root nodes in the calculation of the tree. For example, the root node can be selected based on wavelength origination/termination, cost, bandwidth, etc. In an exemplary embodiment, the root node is selected as the origination or termination of a particular wavelength.

The method 50 determines least cost paths to the root node (step 54). The computed spanning tree has the property that wavelengths from any node to the root node traverse a least cost path, i.e., a path from a node to the root node that has minimum cost among all paths from the node to the root node. In another exemplary embodiment, the least cost paths can be ones in which every node 12 is traversed such as with the all-broadcast architecture. The cost of traversing a path is the sum of the costs of the links 14 on the path. Different technologies can have different default costs for the links 14. For example, the costs can be based on photonic attributes such as link length, link loss, regeneration, amplification, non-linear effects, available bandwidth, etc. An administrator can configure the cost of traversing a particular link 14. The property that wavelengths always traverse least-cost paths to the root is guaranteed by the following two rules, least cost path from each node 12 and least cost path from each link 14. First, for least cost path from each node, after the root node has been chosen, each node 12 determines the cost of each possible path from itself to the root node. From these, each node 12 picks one of the paths with the smallest cost (a least-cost path). A port connecting to that path becomes the root port (RP) of the node 12. Second, for least cost path from each link 14, the nodes on a link 14 collectively determine which node 12 has the least-cost path from the link 14 to the root node. A port connecting this node 12 to the link 14 is then the designated port (DP) for the link 14. As described herein, ports refer to devices or optical components allowing a wavelength or group of wavelengths to exit a node 12 to a link 14.

Once DPs and RPs are determined, other ports can be designated blocked ports (BP), i.e., the optical components on these ports are set to block the wavelength or group of wavelengths. The method 50 can be used in the all-broadcast architecture to set the optical blocking elements 42 based on the determination of the blocked ports. Note, there can be ties in the method 50, e.g., two or more ports on a same node 12 are attached to least-cost paths to the root or two or more bridges on the same link 14 have equal least-cost paths to the root. For root ports ties, when multiple paths from a node 12 are least-cost paths, the chosen path can use the neighbor node with the lower node identification (ID) or any other distinguishing feature between the nodes 12. For designated port ties, when more than one node 12 on a link 14 leads to a least-cost path to the root, the node 12 with the lower node ID or any other distinguishing feature can used to forward wavelengths to the root. There could be further ties, e.g., as when two nodes 12 are connected by multiple cables. In this case, multiple ports on a single node 12 are candidates for root port. In this case, the path which passes through the port on the neighbor node 12 that has the lowest port priority or some other distinguishing feature can be used.

Figure 5:
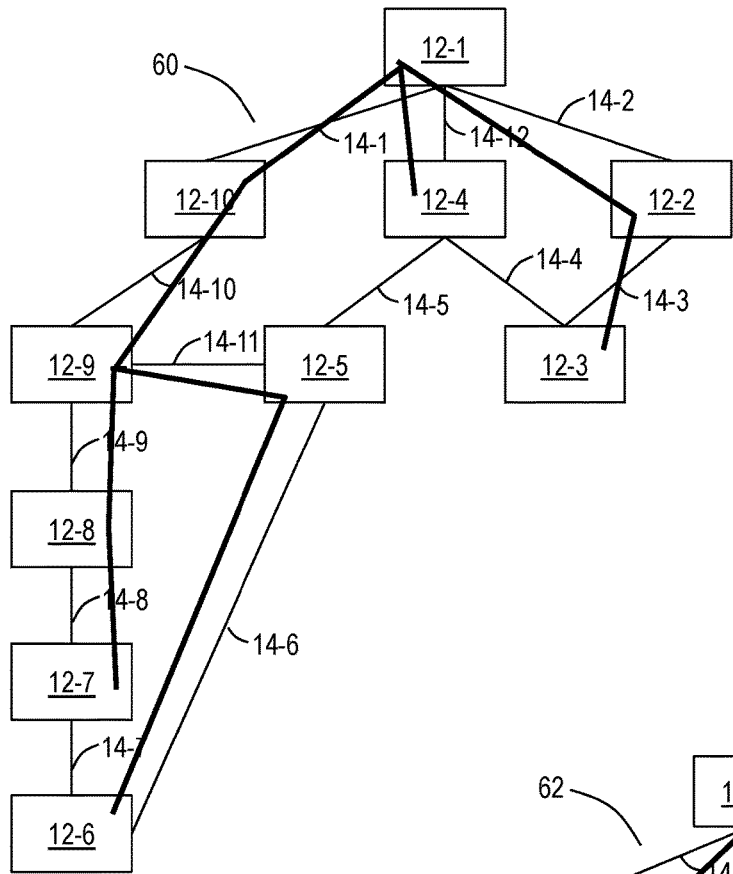
FIG. 5 is a tree diagram of the network of FIG. 1 with a node (node 12-1) designated as the root node.
Figure 6:
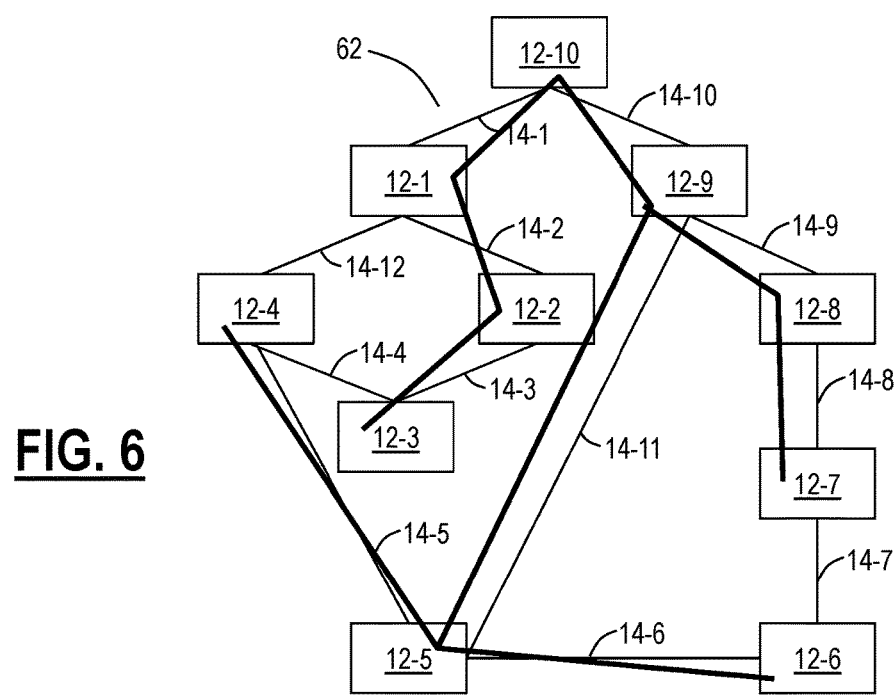
FIG. 6 is a tree diagram of the network of FIG. 1 with another node (node 12-10) from FIG. 5 designated as the root node.

Referring to FIGS. 5 and 6, in exemplary embodiments, trees illustrates the network 10 with the node 12-1 designated as the root node (FIG. 5) and the node 12-10 designated as the root node (FIG. 6). In this example, assume all links 14 have an equal cost of 1 except the link 14-12 which has a cost of 3. The method 50 is used to compute spanning trees 60, 62 in the network 10. Based on the spanning trees 60, 62, the optical blocking elements 42 can be set such that each of the nodes 12 is reached in a loop-free, i.e., single, constrained path, in the network 10. Upon failures of any link 14, a new spanning tree can quickly and efficiently be computed removing the failed link 14 from the computation and readjusting the optical blocking elements 42 based on the new result.

In an exemplary embodiment, it may be advantageous to light up particular links 14 that have optical amplifiers on these links. In particular, optical amplifiers, e.g., EDFAs, require start-up time and thus it may be advantageous to have as many links 14 with optical amplifiers as possible as part of the spanning tree while simultaneously leaving non-amplified links 14 as inactive. The goal here is to leave unamplified links 14 as inactive such that they can be switched to faster if a recomputation is required of the spanning tree, i.e., it is faster to switch to an unamplified link 14 than starting up an inactive amplifier on an amplified link 14. In this context, the costs can be modified such that the method 50 biases selection of amplified links 14 in any spanning tree computation. Other biases could also be added in the method 50, such as, for example, long links, regenerator links, high-bandwidth links, etc.

The spanning tree method 50, by definition, computes a tree through the network 10 such that each node 12 is traversed. In an exemplary embodiment, the method 50 can be utilized with the broadcast and select architecture such that the wavelength or group of wavelengths is available at every node 12 in a loop-free configuration based on the selection of the initial root node. In the context of the broadcast and select architecture, this may not be required, i.e., a wavelength or group of wavelengths may be able to avoid certain nodes 12. Those of ordinary skill will recognize the method 50 can be modified to handle this case by selecting a single least cost path between originating and terminating nodes for the wavelength or group of wavelengths. In this case, the method 50 can be used to compute a path from an originating node 12 to a terminating node 12 of a particular wavelength. For example, the originating or terminating node 12 can be designated as the root node and the other node can be the one from which the least cost path is computed to the root node. The method 50 can be adapted to compute a single least cost path between the two nodes, i.e., not necessarily a spanning tree.

Shortest Path Bridging

IEEE 802.1aq, Draft Standard for Local and Metropolitan Area Networks—Media Access Control (MAC) Bridges and Virtual Bridged Local Area Networks—Amendment 9: Shortest Path Bridging, (December 2011), the contents of which are incorporated by reference herein, is an emerging standard that enables greater scaling of Ethernet bridging. IEEE 802.1aq inherits capabilities from Provider Backbone Bridging, IEEE 802.1ah, IEEE Standard for Local and metropolitan area networks—Virtual Bridged Local Area Networks Amendment 7: Provider Backbone Bridges, 2008, the contents of which are incorporated by reference herein. IEEE 802.1aq allows greater use of link resources through the use of shortest path trees, as opposed to spanning trees. As compared to a spanning tree, a set of shortest path trees over the same topology of Ethernet bridges and links allows traffic to flow over paths between bridges that would otherwise not be available in the spanning tree. In Shortest Path Bridging (SPB), a set of bridges and links are confined to a Shortest Path Tree Region and within this topology, forwarding of packets follows shortest path trees and not spanning trees. In an exemplary embodiment, the routing systems and methods can apply concepts from shortest path bridging (SPB) methods to optical broadcast and select networks, i.e., the bridges are the nodes 12 and the links are the links 14.

An overview of SPB, its principles, and applications is found in D. Allan et al., "Shortest Path Bridging: Efficient Control of Larger Ethernet Networks", IEEE Communications Magazine, October 2010, the contents of which are incorporated by reference herein. A comprehensive description of the architecture and context of the protocol is detailed in David Allan and Nigel Bragg, "802.1aq Shortest Path Bridging Design and Evolution: The Architect's Perspective", Wiley, February 2012, ISBN 978-1-1181-4866-2, the contents of which are incorporated by reference herein. Two variations of SPB are detailed in the draft standard IEEE 802.1aq. The first, called SPB VID (VLAN ID), or SPBV, describes the use of shortest path trees for IEEE 801.ad Provider Bridged (or "Q-in-Q") networks. The second, called SPB MAC, or SPBM, describes the use of shortest path trees for IEEE801.ah (or "MAC-in-MAC") networks which are more scalable due to the addition of a provider MAC layer. For the purposes of explaining SPB for optical broadcast and select networks, the discussion is restricted to SPBV for illustration purposes only.

Figure 7:
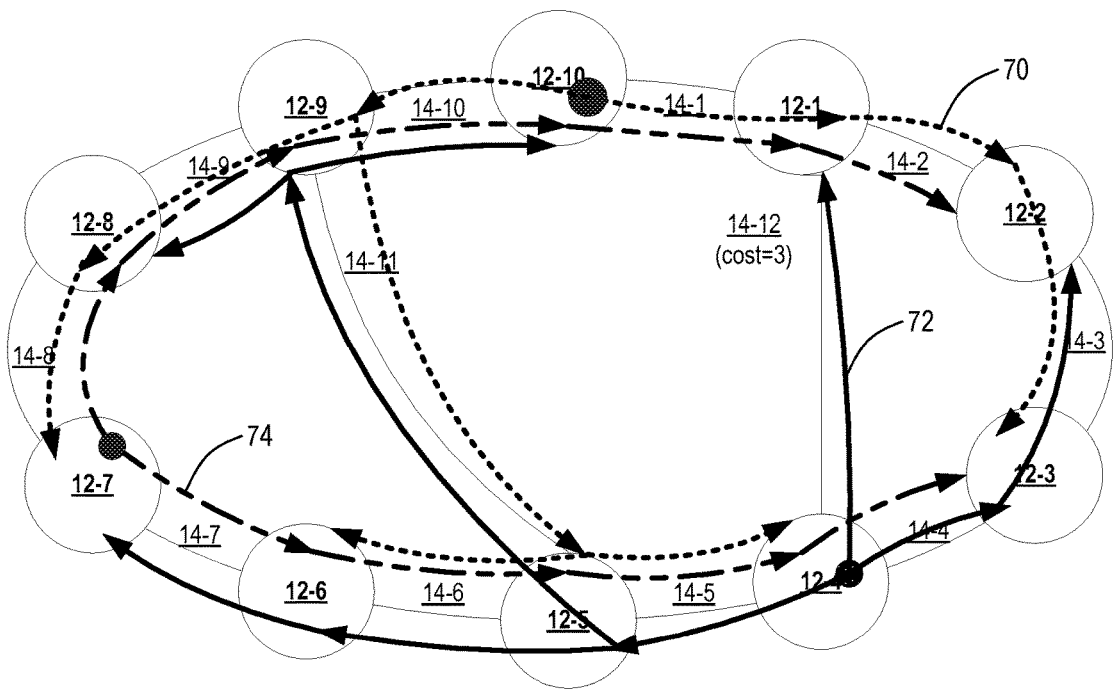
FIG. 7 is a network diagram of the network of FIG. 1 with three exemplary Shortest Path Trees (SPT)

Referring to FIG. 7, in an exemplary embodiment, a network diagram illustrates the network 10 with three exemplary Shortest Path Trees (SPT) 70, 72, 74. In a Shortest Path Tree (SPT) Region in which SPBV is operating, a shortest path tree is created for each bridge and that bridge is the root of the tree. The set of shortest path trees (SPTs) in that Shortest Path Tree Region must adhere to the constraint that between any two bridge pairs, the forward and reverse paths must be the same. The draft standard IEEE 802.1aq includes definitions of path computation algorithms which satisfy this constraint. In FIG. 7, assume all of the nodes 12 are Ethernet provider bridges, and the three SPTs 70, 72, 74 are shown for illustration. The SPTs 70, 72, 74 adhere to the rule about symmetric forward/reverse paths, for example between the nodes 12-7, 12-4, the SPT 74 path from the node 12-7 to the node 12-4 is the same as the SPT 72 path from the node 12-4 to the node 12-7. In the case of the nodes 12-10, 12-4, it might be thought that the SPT 72 rooted at the node 12-4 would have used the link 14-1, but this would have violated the constraint that the forward and reverse path between the nodes 12-10, 12-4 follow the same set of links, and the algorithm has found the route via the link 14-11 as the shortest path in both directions. In Ethernet, SPTs in the Shortest Path Tree Region are distinguished by different VLAN IDs, or VIDs. These are known as shortest path VIDs or SPVIDs, and are from the same identifier space as IEEE802.1ad S-VIDs. What is important for forwarding is that an SPT tree is used for both unicast and multicast forwarding.

Figure 8:
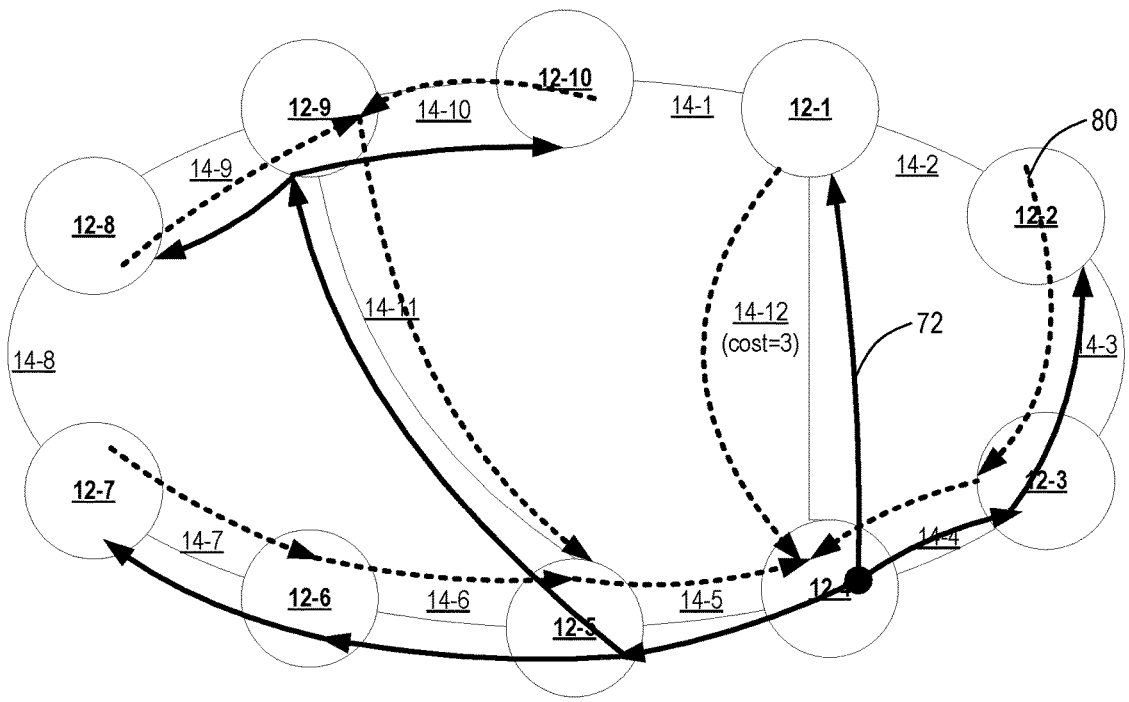
FIG. 8 is a network diagram of the network of FIG. 1 with an exemplary congruent multipoint to point (mp2p) tree created for one of the SPTs of FIG. 7.

Referring to FIG. 8, in an exemplary embodiment, a network diagram illustrates the network 10 with an exemplary congruent multipoint to point (mp2p) tree 80 created for the SPT 72. The effect of the symmetry constraint is that a congruent multipoint to point tree is created for each SPT 70, 72, 74. FIG. 8 illustrates the mp2p tree 80 for the SPT 72 rooted at the node 12-4. The mp2p tree 80 for unicast to the node 12-4 is always congruent with the point to multipoint (p2mp) multicast tree from the node 12-4. This must hold if there is consistent tie-breaking, and must be true for SPBV if the reverse path learning is to work. Other SPTs are a priori independent, but the moment any SPT of the form A→X→B is built, all communication from A→B will follow that route, both unicast and multicast. The computation of SPTs within a Shortest Path Tree Region, and maintenance under topology change, is the responsibility of the Intermediate System To Intermediate System (ISIS)-SPB protocol, also defined in IEEE 802.1aq. It is an extension of the existing distributed IS-IS routing protocol that can handle MAC addresses. ISIS-SPB handles a number of additional addressing functions (learning, mapping) that are important for the Ethernet forwarding plane.

As described herein, optical broadcast and select networks of interest are characterized by multiple wavelengths that are broadcast on each node to all ports except the incoming one, and selective blocking of wavelengths exiting those ports. The purpose of wavelength blocking is to prevent a wavelength from looping back on a port it has already been received on. In a restricted case of such a network, an entire port is blocked at a time and wavelengths are not selectively blocked. In an exemplary embodiment, the routing systems and methods propose to compute loop-free paths in the optical broadcast and select networks can adapt techniques from Ethernet bridging such as SPB. Using SPBV, the FIG. 7 can be re-interpreted as broadcast nodes in a WDM network, i.e., each of the nodes 12 is a broadcast and select node and each of the links 14 is an optical fiber. Each unidirectional SPT is for one wavelength or a set of wavelengths that are routed together. Ethernet port blocking to form SPTs is mirrored as WSS blocking of a wavelength or wavelengths in the same SPT. Explicit construction of forwarding (FIBs) in Ethernet is not specifically carried out in the node 12 since the paradigm is to broadcast all wavelengths to all ports. The reverse path formed by the mp2p tree as shown in FIG. 8 is not used in optical broadcast and select networks. Rather, separate p2mp trees following the symmetric forward/reverse paths rule, are used.

A summary of the application of SPVB is thus:

| In IEEE 802.1ad SPT Region | In optical broadcast and select networks |
|---|---|
| Ethernet Bridge | Broadcast and select node |
| Ethernet link | WDM link |
| SPVID - identifies a unidirectional SPT for unicast and multicast | SPVID - identifies unidirectional SPT for multicast traffic for one or more wavelengths sharing common root and endpoints |
| Filtering database and Forwarding Entries - configured by ISIS-SPB so that ports that aren't part of an SPT are not next hops for an SPVID. | WSSs are programmed to block (egress) ports that are not on an SPT for the wavelength(s) that belong to that SPT. |

In another exemplary embodiment, Shortest Path Bridging can also be applied to computation of non-looping paths in all-broadcast networks. A spanning tree rooted from each node 12 is calculated and forwarding tables generated. In a distributed implementation, all the nodes 12 could know all of the spanning trees. One of the speed optimizations of SPB is that it can use the broadcast capability in Layer 2 (which can be an optical service channel (OSC)) to send updates. Over the OSC, the packet broadcast to all nodes could also be recreated. Some adaptations of MAC addressing and VLAN IDs are required.

Ethernet Ring Protection

G.8032 is defined in ITU-T G.8032 (February 2012) Ethernet Ring Protection Switching the contents which are incorporated by reference herein. A discussion of using G.8032 for protection switching in a generalized manner is described in commonly-assigned co-pending U.S. patent application Ser. No. 13/435,225 filed Mar. 30, 2012 and entitled "GENERALIZED SERVICE PROTECTION SYSTEMS AND METHODS," the contents of which are incorporated by reference herein. The G.8032 control protocol can be applied to ring topologies of all-broadcast or broadcast and select architectures providing a more predictable protection switching time. Of note, G.8032 requires more up front work to vet the topology and setup. As applied to ring topologies of all-broadcast or broadcast and select architectures each ring employs a blocking point that prevents traffic looping. Under single failure of a link in the ring, that failure point becomes the blocking point and the original blocking point is unblocked, thus allowing traffic to flow around the ring. The G.8032 protocol controls the blocking and unblocking behavior of the ring traffic in response to failure/ repair events. Multiple G.8032 rings could also be interconnected to form mesh networks subject to the limitation that branching does not exceed the broadcast limits of the nodes 12. If there were per wavelength blocking, such as in the broadcast and select architecture, stacked virtual rings could be created as well.

Shortest Path Methods

Figure 9:
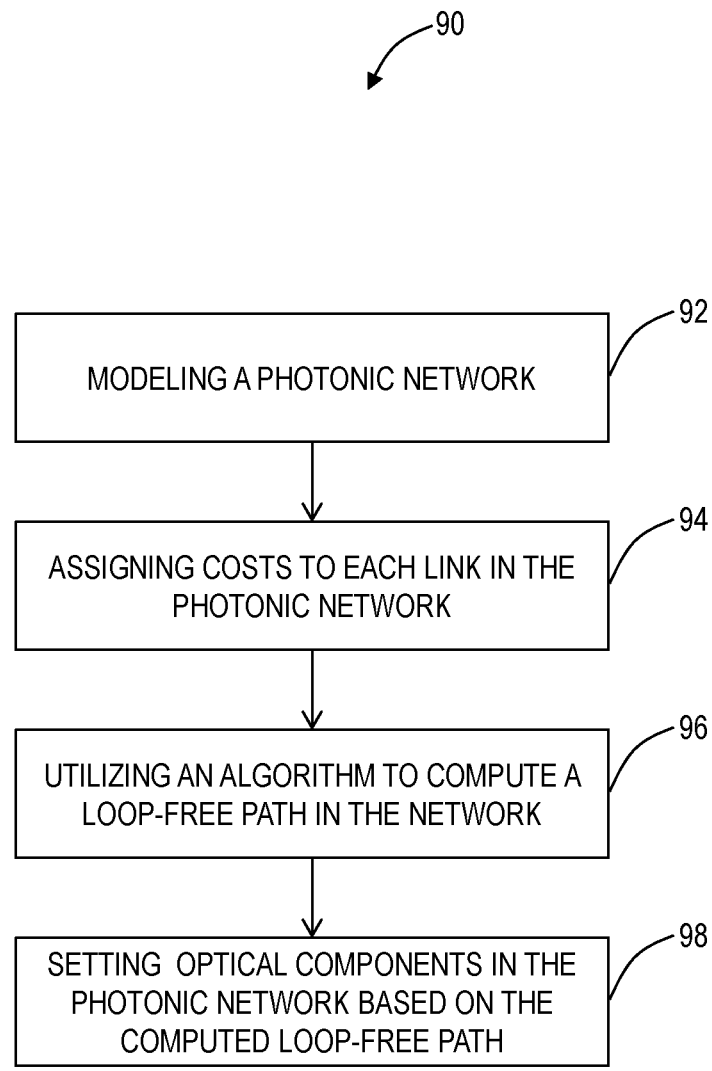
FIG. 9 is a flowchart of a method for routing in a photonic network, such as the network of FIG. 1.

Referring to FIG. 9, in an exemplary embodiment, a flowchart illustrates a method 90 for routing in a photonic network, such as the network 10. The method 90 can be implemented as an optical routing protocol operating on the network 10. The method 90 can be used on the broadcast and select architecture or the all-broadcast architecture. Note, the method 90 engineers optical networks such that any combination of computed loop free paths is feasible. The application of shortest path methods to an optical network for multiple wavelengths is not guaranteed to work as wavelengths could affect each other in a link. As described herein, the routing systems and methods and the method 90 approach routing in a photonic network in a similar fashion as routing/bridging at Layers 2 and 3. Specifically, the routing systems and methods assume an all-broadcast paradigm optically in any optical architecture, and the routing problem becomes determining which ports are blocked. As described herein, this is analogous to Ethernet packet bridging, for example. In an exemplary embodiment, the method 90 can be used to compute a shortest path tree in the network 10 and to set various optical components accordingly.

First, the method 90 models the photonic network (step 92). This modeling includes abstracting a physical topology to a logical graph. For example, using the network 10, the nodes 12 could be modeled as vertices and the links 14 can be modeled as edges. Costs are assigned to each of the links 14 (edges) in the photonic network (step 94). The costs will be used by a graph algorithm in computing paths through the graph (i.e., the network 10). In an exemplary embodiment, the costs can be based on link length, link loss, bandwidth, regeneration, amplification, non-linear effects, or any other factor. Further, the costs can be user adjustable. An algorithm is used to compute a loop-free path in the network (step 96). The algorithm can include various shortest path methods such as the well-known Dijkstra or Floyd algorithms to produce a shortest path tree through the network 10 for the loop-free path. Once the loop-free path is computed, optical components can be set in the photonic network based thereon (step 98). The optical components can be devices based on the optical architecture, e.g., the broadcast and select architecture, the all-broadcast architecture, etc. For example, the optical components can include WSSs configured to selectively block any wavelength exiting any port based on the computed loop-free path. Alternatively, the optical components can include an optical blocking element located in-line with each degree of a node 12.

Layer 3 Distributed Routing

Open Shortest Path First (OSPF), defined in RFC 2328, "OSPF Version 2) (1998), and RFC 5340, "OSPF for IPv6" (2008), is an adaptive routing protocol using a link state routing algorithm. OSPF computes a shortest path tree for each route using a method based on Dijkstra's algorithm, a shortest path first algorithm. Further, OSPF relies on link state messaging between nodes. In an exemplary embodiment, OSPF can be adapted to control the network 10. For example, link state messages can be exchanged between the nodes 12 via an optical service channel (OSC) or some other out-of-band messaging scheme. Each of the nodes 12 can maintain a link state database equivalent. The output of such a variation of OSPF could be used to control WSSs in the broadcast and select architecture or the optical blocking elements in the all-broadcast architecture.

Software Defined Networking

Again, the routing systems and methods described herein assume an all-broadcast paradigm optically regardless of optical architecture (e.g., the broadcast and select optical networks, all-broadcast optical networks, etc.), and the routing problem becomes determining which ports should be blocked. The routing systems and methods can use a software defined networking (SDN) approach for path computation, i.e. determinations of where network blocking elements configurations are needed in the all-broadcast network. Work on SDN calls for the ability to centrally program provisioning of forwarding in the network in order for more flexible and precise control over network resources to support new services. Generally, a path computation element (PCE) is a system component, application, or network node that is capable of determining a finding a suitable route for conveying data between a source and a destination. Path Computation Elements (PCEs) are described, for example, in RFC 4655 "A Path Computation Element (PCE)-Based Architecture," (August 2006), the contents of which are incorporated by reference herein. This includes another standardized interface that has been defined for path computation, where the source node does not do its own path computation upon receiving a connection request but makes a query to the centralized PCE.

Figure 10:
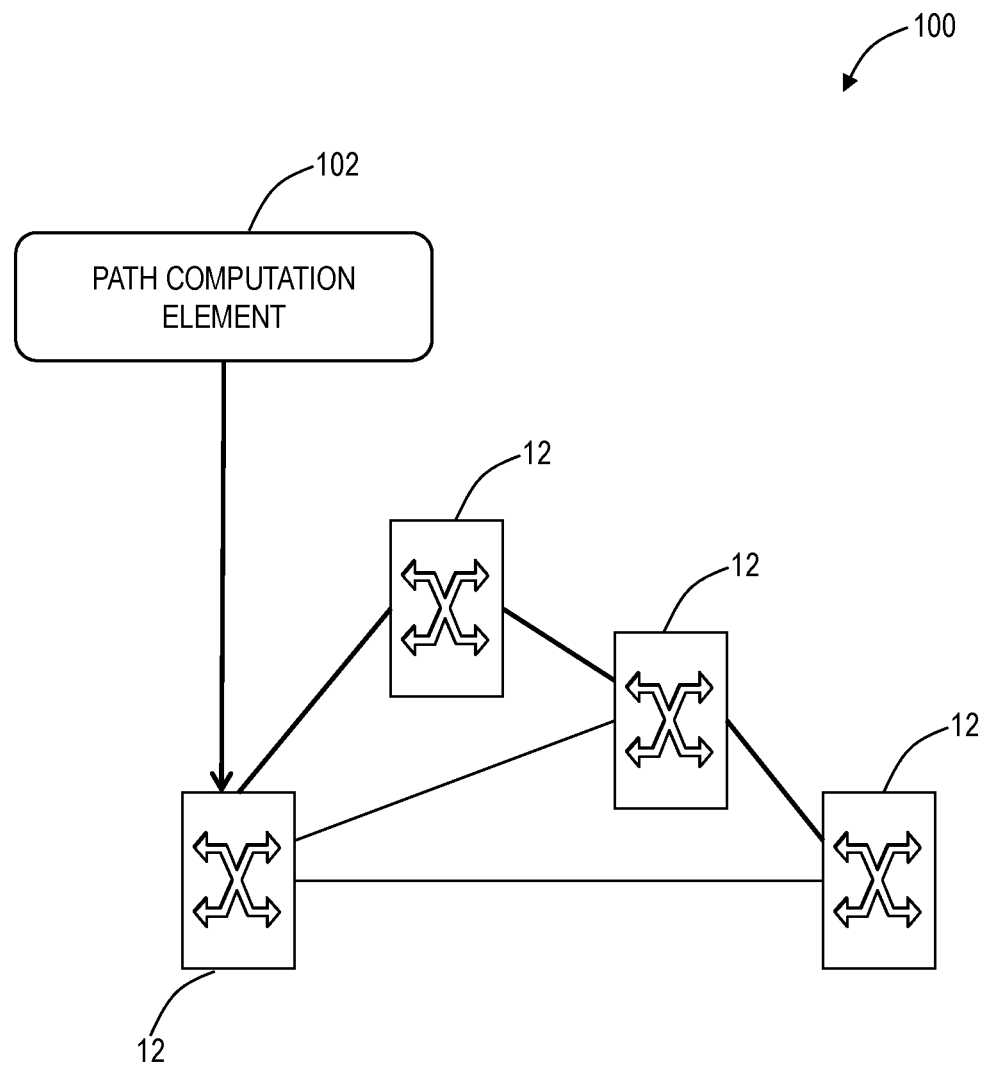
FIG. 10 is a network diagram of a network utilizing the routing systems and methods described herein with a path computation element (PCE).

Referring to FIG. 10, in an exemplary embodiment, a network diagram illustrates a network 100 utilizing the routing systems and methods described herein with a path computation element (PCE) 102. The network 100 includes a plurality of interconnected nodes 12 which each can include one or more blocking elements as described herein. Again, the nodes 12 utilize an all-broadcast approach to routing optical signals therebetween, and the blocking elements are required to prevent loops and to implement protection responsive to failures. In general, the PCE 102 can be configured to implement the various routing systems and methods described herein. That is, the PCE 102 can abstract a topology of the network 102, compute a loop-free path through the network 102, and determine locations for path blocking at one or more of the nodes 12. While the network 100 is illustrated as a mesh of the nodes 12, those of ordinary skill in the art will recognize that any network topology is contemplated herewith.

The PCE 102 can be an application that can be located within one of the nodes 12 or a component, such as on server communicatively coupled to one or more of the nodes 12. In addition to RFC 4655, PCEs are defined in various RFC's from the IETF such as, for example, RFC 4657 "Path Computation Element (PCE) Communication Protocol Generic Requirements," RFC 4674 "Requirements for Path Computation Element (PCE) Discovery," RFC 4927 "Path Computation Element Communication Protocol (PCECP) Specific Requirements for Inter-Area MPLS and GMPLS Traffic Engineering," RFC 5376 "Inter-AS Requirements for the Path Computation Element Communication Protocol (PCECP)," RFC 5394 "Policy-Enabled Path Computation Framework," RFC 5440 "Path Computation Element (PCE) Communication Protocol (PCEP)," and the like, each of which is incorporated by reference herein.

An exemplary advantage of the PCE 102 is that the PCE 102 enables outside clients to obtain optimal paths in the network 100 without having to know the full topology and the like of the network 100. To perform path computations, the PCE 22 stores the network 100 topology and resource information in a database. To request path computation services to the PCE 102, RFC 5440 defines the PCE Communication Protocol (PCEP) for communications between a path computation client (PCC) and the PCE 102, or between two PCEs. The PCC can initiate a path computation request to the PCE 102 through a Path Computation Request (PCReq) message, and then the PCE 102 will return the computed route to the requesting PCC in response to a previously received PCReq message through a PCEP Path Computation Reply (PCRep) message. In the context of the routing systems and methods, the computed route can include a loop free path and selected path blocking locations based on the various techniques described herein.

While described herein with respect to the PCE 102, the routing systems and methods can use other centralized approaches such as via a management system or the like. In these various exemplary embodiments, the PCE/centralized approach includes the network blocking element configuration being determined "out of skin" and pushed into the network 100. The higher level app/PCE is then responsible for the topology and calculation of the state of each of the nodes 12. The communications to the nodes 12 would then be done using a data communication network (DCN) connection rather than the OSC as described. Both OSC and DCN could be used in concert to provide the necessary logical connection from each node 12 to the PCE.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An optical node, comprising:
    optical routing components communicatively coupled to one or more degrees connected to an optical network, wherein the optical routing components broadcast one or more channels between all the one or more degrees; and
    one or more blocking elements associated with the one or more degrees, wherein the one or more blocking elements are enabled based on a loop-free path in the optical network for the one or more channels.

2. The optical node of claim 1, wherein the optical routing components utilize a broadcast and select architecture and the one or more blocking elements are configured to prevent a wavelength or group of wavelengths associated with the one or more channels from looping back on a port where the wavelength or group of wavelengths has already been received on.

3. The optical node of claim 1, wherein the optical routing components utilize an all-broadcast architecture and the one or more blocking elements are configured to prevent multiple paths for a wavelength or group of wavelengths associated with the one or more channels by constraining the wavelength or group of wavelengths to a single path through the optical network.

4. The optical node of claim 1, further comprising:
    a processor communicatively coupled to the one or more blocking elements and configured to determine the loop-free path.

5. The optical node of claim 4, wherein the loop-free path is determined based on a spanning tree in the optical network from any node in the optical network to a root node, and wherein wavelength blocking by the one or more blocking elements is based on the spanning tree.

6. The optical node of claim 4, wherein the loop-free path is determined based on a shortest path tree in the optical network from any node in the optical network to a root node, and wherein wavelength blocking by the one or more blocking elements is based on the shortest path tree.

7. The optical node of claim 4, wherein the loop-free path is determined based on Ethernet Ring Protection Switching as a control protocol, applied to the optical network.

8. The optical node of claim 4, wherein the loop-free path is determined based on an optical routing protocol associated with the optical network.

9. The optical node of claim 4, wherein the loop-free path is determined based on link state protocols and associated link state messages to determine wavelength blocking by the blocking elements in the optical network.

10. An optical network, comprising:
    a plurality of interconnected nodes which broadcast one or more channels between one another; and
    one or more blocking elements associated with the plurality of interconnected nodes, wherein the one or more blocking elements are enabled based on a loop-free path in the optical network for the one or more channels.

11. The optical network of claim 10, wherein the plurality of interconnected nodes utilize a broadcast and select architecture and the one or more blocking elements are configured to prevent a wavelength or group of wavelengths associated with the one or more channels from looping back on a port where the wavelength or group of wavelengths has already been received on.

12. The optical network of claim 10, wherein the plurality of interconnected nodes utilize an all-broadcast architecture and the one or more blocking elements are configured to prevent multiple paths for a wavelength or group of wavelengths associated with the one or more channels by constraining the wavelength or group of wavelengths to a single path through the optical network.

13. The optical network of claim 10, further comprising:
   a path computation processor communicatively coupled to the one or more blocking elements and configured to determine the loop-free path.

14. The optical network of claim 13, wherein the loop-free path is determined based on a spanning tree in the optical network from any node in the optical network to a root node, and wherein wavelength blocking by the blocking elements is based on the spanning tree.

15. The optical network of claim 13, wherein the loop-free path is determined based on a shortest path tree in the optical network from any node in the optical network to a root node, and wherein wavelength blocking by the blocking elements is based on the shortest path tree.

16. The optical network of claim 13, wherein the loop-free path is determined based on Ethernet Ring Protection Switching as a control protocol, applied to the optical network.

17. The optical network of claim 13, wherein the loop-free path is determined based on an optical routing protocol associated with the optical network.

18. The optical network of claim 13, wherein the loop-free path is determined based on link state protocols and associated link state messages to determine wavelength blocking by the blocking elements in the optical network.

19. A path computation apparatus, comprising:
   a processor communicatively coupled to one or more blocking elements in an all-broadcast optical network; and
   memory storing instructions that, when executed, cause the processor to
      responsive to a path request for a channel in the optical network, determine a path through the optical network for one or more wavelengths associated with the channel,
      determine a location on the path to form a loop-free path in the optical network, and
      cause the wavelength blocking at the location through the one or more blocking elements.

20. The path computation apparatus of claim 19, wherein the path computation apparatus comprises a path computation element (PCE) which enables outside clients path computation without presenting a full topology of the optical network thereto.

* * * * *